(12) United States Patent
Takeoka et al.

(10) Patent No.: US 7,233,124 B2
(45) Date of Patent: Jun. 19, 2007

(54) MOTOR DRIVE INVERTER CONTROL APPARATUS

(75) Inventors: Yoshinori Takeoka, Shiga (JP); Koji Hamaoka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/595,074

(22) PCT Filed: Nov. 16, 2004

(86) PCT No.: PCT/JP2004/016971

§ 371 (c)(1),
(2), (4) Date: Jan. 30, 2006

(87) PCT Pub. No.: WO2005/067133

PCT Pub. Date: Jul. 21, 2005

(65) Prior Publication Data

US 2006/0208687 A1    Sep. 21, 2006

(30) Foreign Application Priority Data

Jan. 5, 2004    (JP) .............................. 2004-000087

(51) Int. Cl.
*H02P 27/04* (2006.01)
(52) U.S. Cl. ...................... 318/801; 318/701; 318/376; 318/717; 318/817

(58) Field of Classification Search ................ 318/801, 318/701, 376, 717, 703, 727, 757, 795, 798, 318/800, 817; 363/37
See application file for complete search history.

(56) References Cited

U.S. PATENT DOCUMENTS 5,449,993 A * 9/1995 Davis .......................... 318/701
5,777,861 A * 7/1998 Shimizu et al. ................ 363/37

FOREIGN PATENT DOCUMENTS

| JP | H6/351258 A | 12/1994 |
| JP | H11/27953 A | 1/1999 |
| JP | 2002/44958 A | 2/2002 |
| JP | 2002/51589 A | 2/2002 |

OTHER PUBLICATIONS

International Search Report of PCT/JP2004/016971.

* cited by examiner

*Primary Examiner*—Karen Masih
(74) *Attorney, Agent, or Firm*—RatnerPrestia

(57) ABSTRACT

A motor drive inverter control apparatus includes a rectifier circuit for rectifying an AC power supply, an inverter circuit driven by an output from the rectifier circuit, a motor driven by an output from the inverter circuit, a first capacitor coupled in parallel to the output of the rectifier circuit, and a second capacitor coupled in parallel to the first capacitor via a diode. The second capacitor has capacitance not less than three times that of the first capacitor. Although the second capacitor shows a ripple content not less than 90% during practical use, it well absorbs regenerative energy produced by the motor. As a result, elements of the apparatus can be prevented from degrading caused by an over-voltage, and the apparatus can be downsized and reduced its cost.

13 Claims, 4 Drawing Sheets

MOTOR DRIVE INVERTER CONTROL APPARATUS

THIS APPLICATION IS A U.S. NATIONAL PHASE APPLICATION OF PCT INTERNATIONAL APPLICATION PCT/JP2004/016971, filed Nov. 16, 2004.

FIELD OF THE INVENTION

The present invention relates to motor drive inverter control apparatuses to be mounted in compressors or blowers used in refrigerating or air-conditioning systems such as refrigerators or air conditioners.

BACKGROUND OF THE INVENTION

An inverter control apparatus for driving a motor mounted in a compressor or a blower used in a refrigerating or an air-conditioning system generally has the following structure: AC power fed into a refrigerating system undergoes full-wave rectification in a rectifier circuit, and passes across a smoothing capacitor having a great enough capacitance and being hooked up between output terminals. This structure allows driving an inverter with a DC power supply having a small ripple content, and also absorbing regenerative energy which is produced when the motor stops or slows down, so that an over-voltage can be prevented.

In recent years, smoothing capacitors have been targeted to substantially reduce their capacitance in order to downsize the motor drive inverter control apparatuses. The related art is disclosed in, e.g. Japanese Patent Unexamined Publication No. 2002-51589. The conventional motor drive inverter control apparatus is described hereinafter with reference to the drawings. FIG. 6 shows a block diagram illustrating a motor drive inverter control apparatus that employs a conventional capacitor having small capacitance.

As shown in FIG. 6, the conventional motor drive inverter control apparatus has the following mechanism: The power fed by AC power supply 1 is received by rectifier circuit 2, of which output is coupled to smoothing capacitor 3, and capacitor 3 has a small enough capacity as smaller as 1/100 those of conventional ones.

Inverter 4 is formed of 6 pieces of switching elements (including reversed diodes) coupled together into a three-phase bridge, and coupled in parallel to smoothing capacitor 4. Motor 5 generally employs a brush-less motor, and three-phase windings are provided to its stator. Respective ends of the three-phase windings are coupled to an output of inverter 4.

Control circuit 7 is hooked up to the inverter control apparatus such that it receives information including voltage "v" of AC power supply 1, current "idv" of a DC section, output current "ia", "ib" and "ic" of inverter 4, and rotational position θ of motor 5 obtained by position detecting means 6. Control circuit 7 controls the gates of inverter 4 by inputting the information thus obtained such that the motor can be driven optimally.

If control circuit 7 damps the operation of motor 5, regenerative energy flows into the power supply via the diodes inversely hardwired. At that time, since smoothing capacitor 3 has a small enough capacity, it cannot fully absorb the regenerative energy. As a result, the power supply voltage rapidly rises, and an over-voltage sometimes degrades respective driving elements.

DISCLOSURE OF INVENTION

The present invention addresses the problem discussed above, and aims to provide a motor drive inverter control apparatus that can prevent respective driving elements from degrading although the apparatus includes smoothing capacitors having smaller capacitance values. The degradation is caused by an over-voltage due to regenerative energy of the motor.

The motor drive inverter control apparatus of the present invention comprises the following elements:
 a rectifier circuit for rectifying an AC power supply;
 an inverter circuit driven by an output from the rectifier circuit;
 a motor driven by an output from the inverter circuit;
 a first capacitor coupled in parallel to the output of the rectifier circuit;
 a second capacitor coupled in parallel to the first capacitor via a diode;
 a control power supply circuit coupled in parallel to the second capacitor; and
 a control circuit driven by the control power supply circuit, for controlling the inverter circuit.

The first capacitor has a capacity that makes a ripple content of an input voltage to the inverter circuit not less than 90% during practical use of the motor.

The foregoing structure allows the first and the second capacitors to absorb regenerative energy produced by the motor at its slowdown or halt, so that respective driving elements are prevented from degrading, and also a downsized and inexpensive apparatus is obtainable.

DESCRIPTIONS OF REFERENCE MARKS

Figure 1:
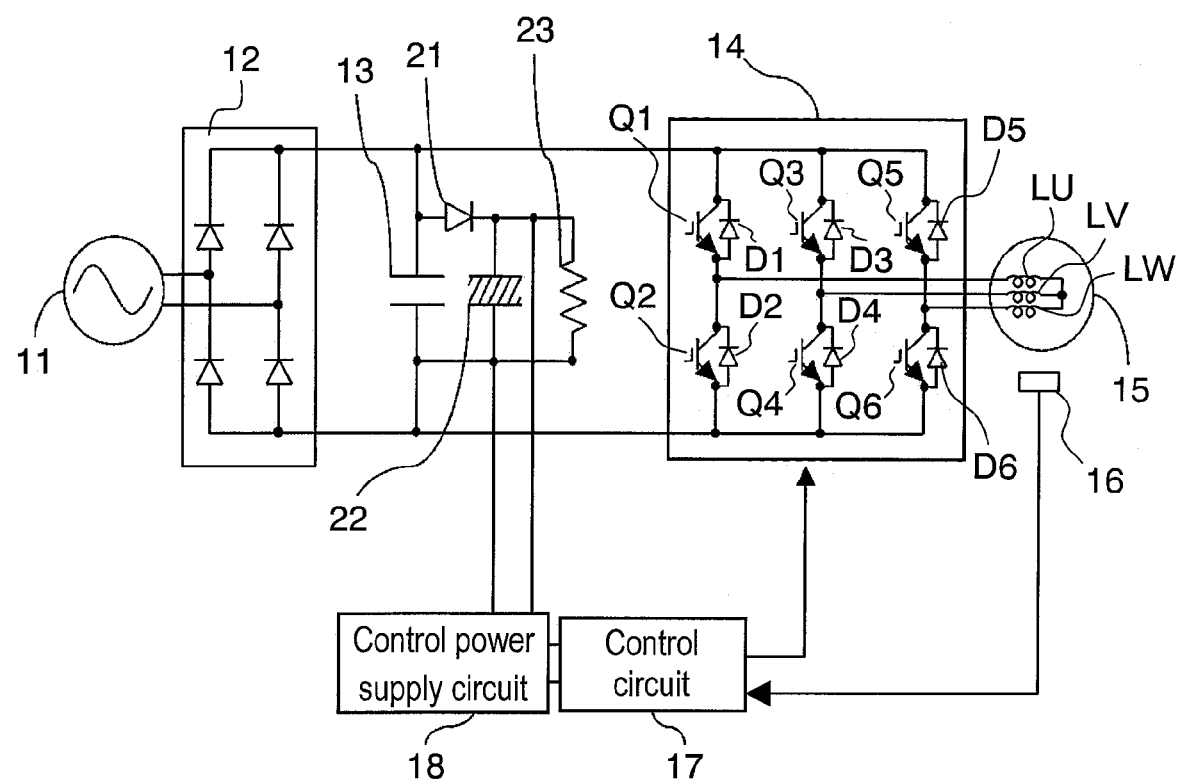
FIG. 1 shows a block diagram illustrating a motor drive inverter control apparatus in accordance with a first embodiment of the present invention.

11 AC power supply
12 rectifier circuit
13 first capacitor
14 inverter circuit
15 motor
17 control circuit
18 control power supply circuit
21 diode
22 second capacitor
23 discharging load

DESCRIPTION OF PREFERRED EMBODIMENTS

Embodiments of the present invention are demonstrated hereinafter with reference to the accompanying drawings.

Embodiment 1

Figure 2:
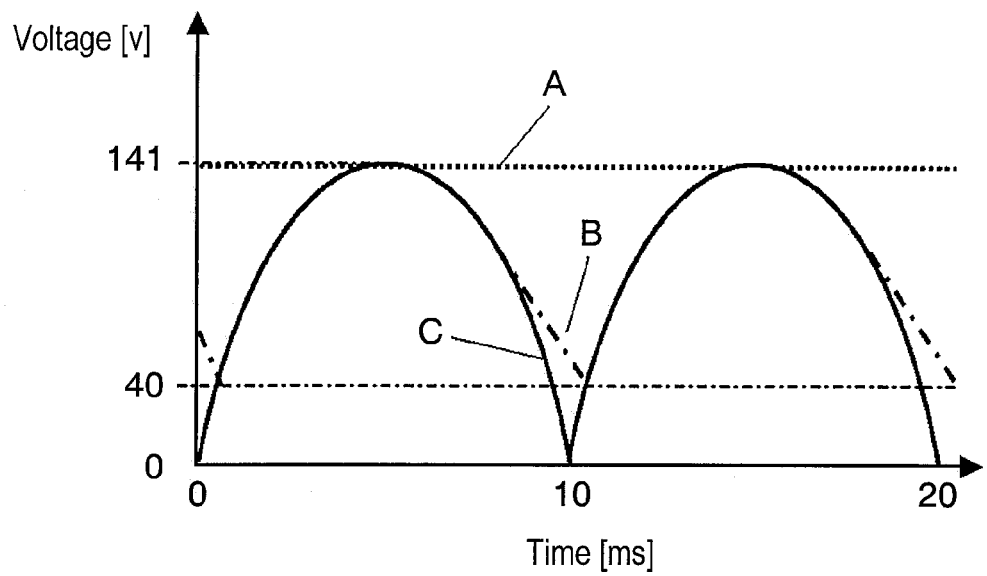
FIG. 2 shows a timing chart illustrating a voltage waveform of a first capacitor used in the first embodiment.
Figure 3:
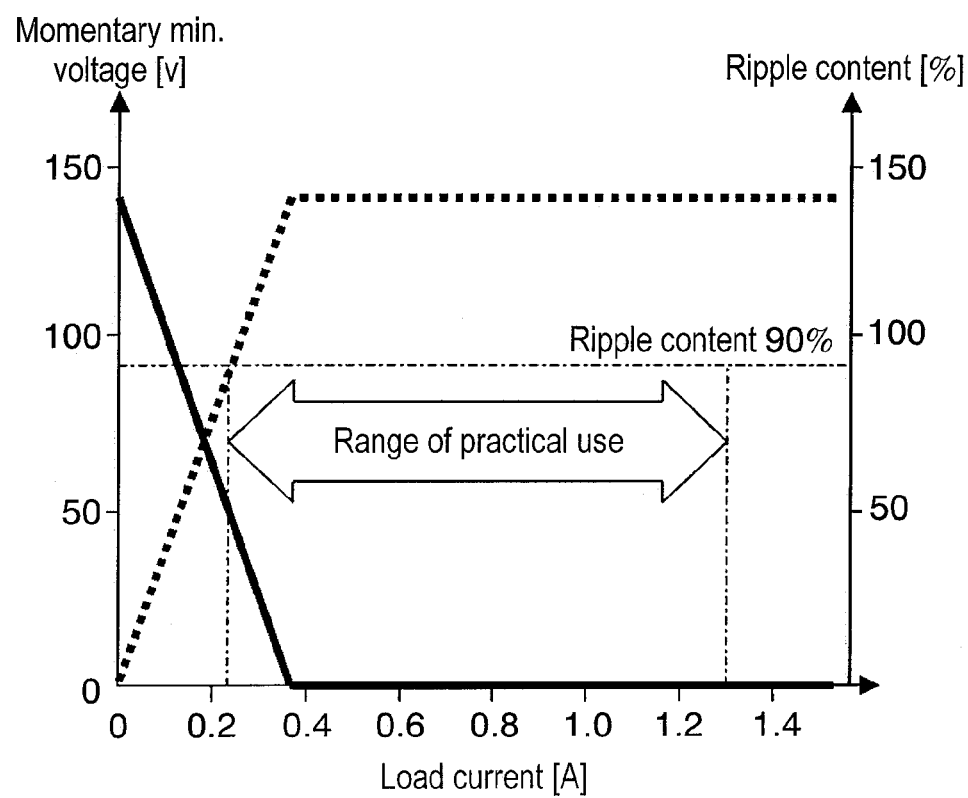
FIG. 3 shows characteristics of a load current, a momentary minimum voltage, and a ripple content
Figure 4:
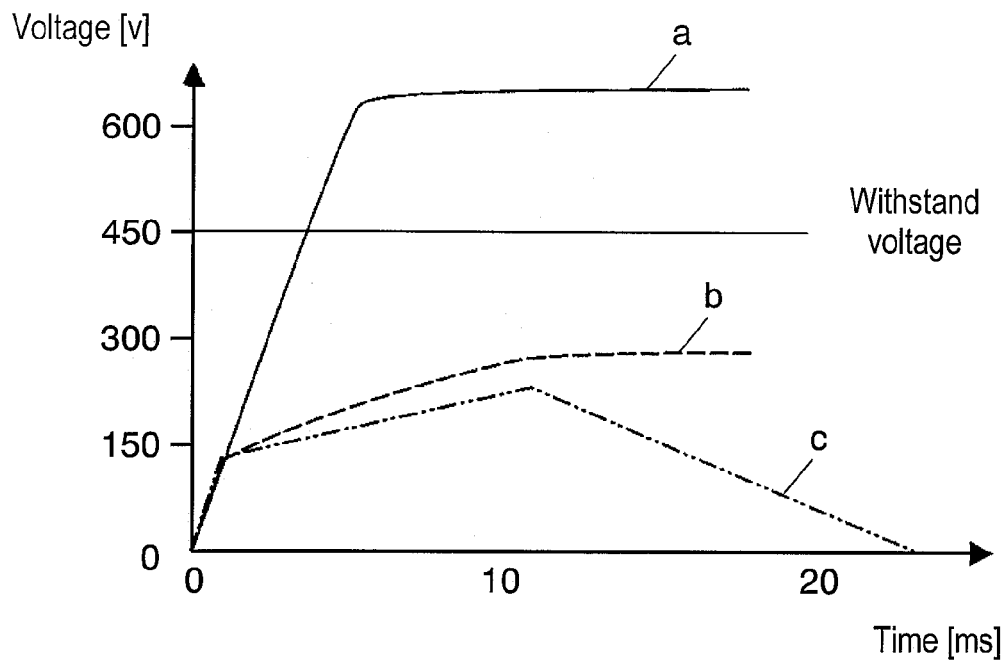
FIG. 4 shows characteristics of respective voltages across a first and a second capacitors in accordance with the first embodiment.

FIG. 1 shows a block diagram illustrating a motor drive inverter control apparatus in accordance with the first embodiment of the present invention. FIG. 2 shows a timing chart illustrating a voltage waveform of first capacitor 13 used in the first embodiment. FIG. 3 shows characteristics of a load current, a ripple content, and a momentary minimum voltage. FIG. 4 shows characteristics of respective voltages across first capacitor 13 and second capacitor 22 in accordance with the first embodiment.

The motor drive inverter control apparatus shown in FIG. 1 has the following structure:

AC power supply 11 is rectified by rectifier circuit 12, and smoothed by first capacitor 13, then the resultant DC power supply is fed into inverter circuit 14. Inverter circuit 14 is formed of switching elements Q1, Q2, Q3, Q4, Q5 and Q6 coupled to each other into a three-phase bridge and flywheel diodes D1, D2, D3, D4, D5 and D6. Those flywheel diodes are coupled in inversely parallel to the foregoing switching elements. Motor 15 has stator windings LU, LV and LW coupled together in a form of three-phase star, and respective ends of those windings are coupled to respective connection points of the switching elements coupled in series.

Motor 15 is, in general, a brush-less DC motor, and has position detector 16 for detecting a position of a rotor (not shown) which includes permanent magnets. This position detector usually employs three Hall elements.

First capacitor 13 is coupled in parallel to a series circuit formed of diode 21 and second capacitor 22. On top of that, second capacitor 22 is coupled in parallel to discharging load 23 (hereinafter referred to as a resistor). First capacitor 13 has a small enough capacity not to have a sufficient smoothing capability.

Second capacitor 22 is placed in order to absorb regenerative energy and has a far greater capacity than first capacitor 13, and it has, in general, 100 times or at least 3 times of the capacitance of first capacitor 13. The second capacitor employs, e.g. an electrolytic capacitor or a film capacitor. The electrolytic capacitor among others is preferable with respect to its smaller size, greater capacitance, and inexpensive cost.

Diode 21 is hooked up in the circuit in order to run a current only from first capacitor 13 to second capacitor 22. Resistor 23 works as a load for discharging the electric charges in second capacitor 22.

Second capacitor 22 is coupled in parallel to control power supply circuit 18, which is formed of a switching regulator or a DC/DC converter. Circuit 18 lowers a voltage across the second capacitor and works as a power supply of control circuit 17 which controls inverter circuit 14.

An operation of the foregoing motor drive inverter control apparatus in accordance with the first embodiment is demonstrated hereinafter. Control circuit 17 controls inverter 14 in response to the rotational position of the rotor, thereby driving motor 15. The rotational position has been detected by position detector 16. Motor current is commutated by 60° in electrical angles sequentially from winding LU to winding LV, from LU to LW, then from LV to LW, and from LV to LU, from LW to LU, and from LW to LV, so that motor 15 is rotated in a given direction. The windings LU, LV and LW are coupled together in a form of three-phase star. This driving method is a well-known one, and referred to as three-phase 120° powering method. There are two kinds of driving waveforms, i.e. a rectangular waveform and a sine waveform by PWM. The present invention can be applicable to either one of those waveforms.

Suppose that motor 15 consumes only a little energy, where AC power supply 11 is single-phase, 100V and 50 Hz. A voltage across first capacitor 13 is 141V smoothed as shown with mark "A" in FIG. 2, and an average voltage is also 141V, a ripple voltage is 0V, and ripple content is 0%. The following formulas are applicable: ripple voltage (V)=momentary max. voltage (V)−momentary min. voltage (V). Ripple content (%)=[ripple voltage (V)/average voltage (V)]×100

Motor 15 increases its consumption energy little by little, which consumes the electric charges in first capacitor 13, and the momentary min. voltage lowers as shown in FIG. 2 with reference mark "B". The momentary max. voltage determined by AC power supply 11 stays at 141V as it is. As mark "B" shows, the momentary min. voltage reaches to 40V, and an average voltage is approx. 112V, a ripple voltage is 101V, and a ripple content is 90%.

Motor 15 further increases its consumption energy, then little electrical charges are stores in first capacitor 13, and the momentary min. voltage lowers almost to 0V as shown in FIG. 2 with mark "C". The momentary max. voltage determined by AC power supply 11 still stays at 141V. As mark "C" shows, the momentary min. voltage reaches to 0V, and an average voltage is approx. 100V, a ripple voltage is 141V, and a ripple content is 141%. As discussed above, since first capacitor 13 has a small capacity, taking out a load current from capacitor 13 results in a waveform where a full-wave rectification takes place over the current supplied from AC power supply 11, and there is little smoothing.

Next, relations among a load current, the momentary min. voltage, and the ripple content are detailed with reference to FIG. 3, in which the lateral axis represents a load current and the vertical axis represents the momentary min. voltage (scale on left side) and also the ripple content (scale on right side). The solid line shows characteristics of the momentary min. voltage, and the broken line shows characteristics of the ripple content.

When the current waveform marked with "A" in FIG. 2 takes place, motor 15 receives almost 0 (zero) ampere, and the momentary min. voltage is 141V, ripple content is 0%. When the current waveform marked with "B" in FIG. 2 takes place, motor 15 receives 0.25 A load current, the momentary min. voltage is 40V, ripple content is 90%. When the current waveform marked with "C" takes place, motor 15 receives 0.35 A, the momentary min. voltage is 0V, and the ripple content is 141%. When motor 15 receives over 0.35 A, the momentary min. voltage and the ripple content remain unchanged.

Suppose that the motor drive inverter control apparatus in accordance with this first embodiment has the following practical range: input current to motor 15 is not less than 0.25 A and not more than 1.3 A. Within this practical range, first capacitor 13 is selected based on a small capacity and the ripple content always staying not less than 90%.

Second capacitor 22, on the other hand, is coupled in parallel to first capacitor 13 via diode 21, so that the energy of second capacitor 22 is consumed only by resistor 23. If motor 15 consumes greater energy, the voltage across second capacitor 22 thus seems to be almost smoothed.

Suppose that first capacitor 13 and second capacitor 22 have a withstand voltage of 450V. Then suppose that a regenerative action occurs, and if the apparatus has only first capacitor 13 as the conventional apparatus has, the voltage rises sharply as shown in FIG. 4 with conventional voltage waveform "a". The voltage exceeds 450 V which is the withstand voltage, and results in an over-voltage.

In this embodiment, since first capacitor 13 is coupled in parallel to second capacitor 22 via diode 21, the voltage-rise due to the regenerative power does not exceed the withstand voltage. However, this circuit structure as it is has possibility that the voltage-rise exceeds the withstand voltage and invites an over-voltage if another regenerative action occurs, because the energy still stays there.

In this embodiment, since resistor 23 is coupled in parallel to second capacitor 22, resistor 23 consumes the energy and the voltage lowers as voltage waveform "c" of first capacitor 13 including resistor 23 shows. As a result, the over-voltage can be prevented.

As discussed above, the motor drive inverter control apparatus in accordance with this first embodiment comprises the following elements:
rectifier circuit 12 for rectifying the AC power supplied from AC power supply 11 into DC power;
inverter 14 for converting the DC power obtained by rectifier circuit 12 into AC power;
motor 15 for receiving the AC power obtained by inverter 14;
first capacitor 13 hooked up between DC bus lines of inverter 14 and having extremely small capacitance;
second capacitor 22 coupled in parallel to first capacitor 13 via diode 21;
control power supply circuit, coupled in parallel to second capacitor 22, for converting a DC high voltage into a DC low voltage;
control circuit 17, coupled to a lower voltage side of control power supply circuit 18, for controlling inverter 14; and
resistor 23 coupled in parallel to second capacitor 22.

The foregoing structure allows first capacitor 13 and second capacitor 22, which is coupled to first capacitor 13 via diode 21, to absorb regenerative energy, and resistor 23 to consume the regenerative energy. As a result, respective driving elements can be prevented from degrading caused by an over-voltage due to regenerative energy.

Second capacitor 22 has little ripples, so that there is no need to worry about degradation due to the heat by ripples. Therefore, although first capacitor 13 has extremely small capacitance and ripple content higher than 90%, the second capacitor can employ an inexpensive electrolytic capacitor, so that a compact and inexpensive motor drive inverter control apparatus is obtainable. This apparatus can prevent its driving elements from degrading caused by an over-voltage due to regenerative energy. Resistor 23 used in this first embodiment is hooked up to a higher voltage side of control power supply circuit 18; however, it can be hooked up in parallel to the lower voltage side of power supply circuit 18.

Resistor 23 coupled to the lower voltage side of control power supply circuit 18 can be omitted, and control circuit 17 of inverter 14 can substitute for resistor 23. This substitution can reduce the number of components, so that a further downsized motor drive inverter control apparatus is obtainable. This apparatus can prevent respective driving elements from degrading caused by an over-voltage due to regenerative energy.

The energy stored in second capacitor 22 can be a power supply of control circuit 17, so that an efficient operation can be expected besides reducing the number of components. A still further downsized motor drive inverter control apparatus is thus obtainable. This apparatus can prevent respective driving elements from degrading caused by an over-voltage due to regenerative energy.

Embodiment 2

Figure 5:
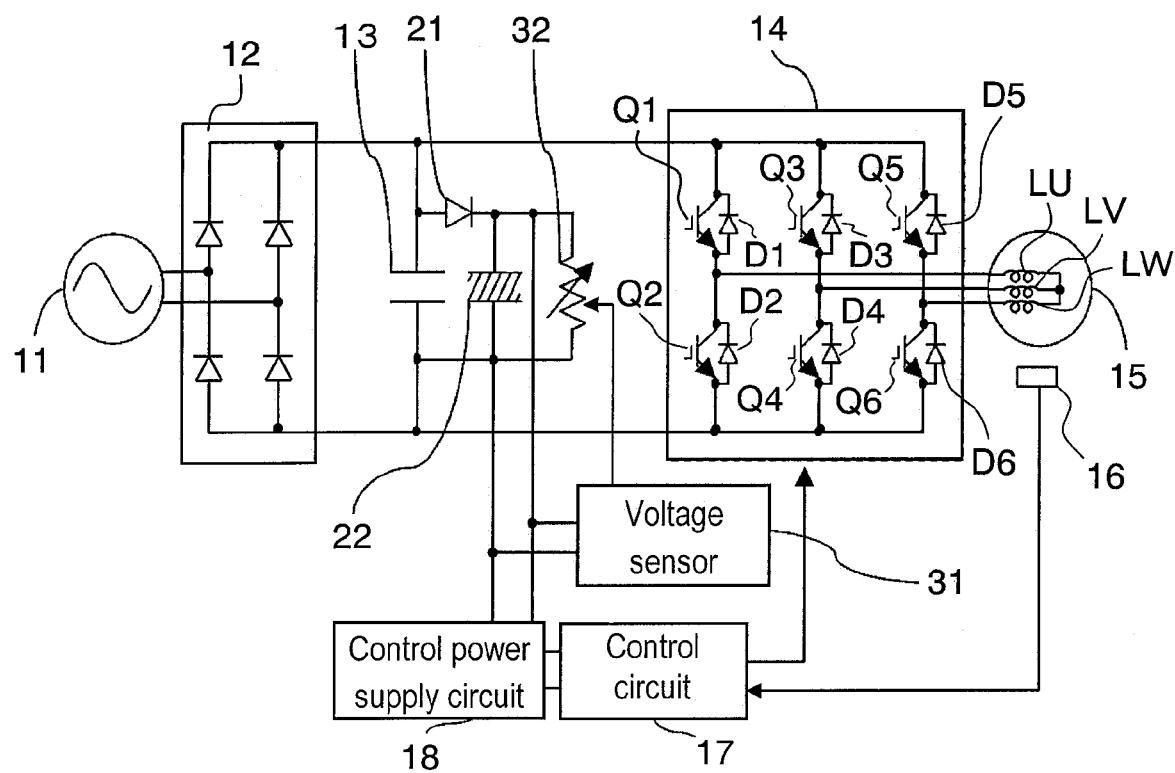
FIG. 5 shows a block diagram illustrating a motor drive inverter control apparatus in accordance with a second embodiment of the present invention.
Figure 6:
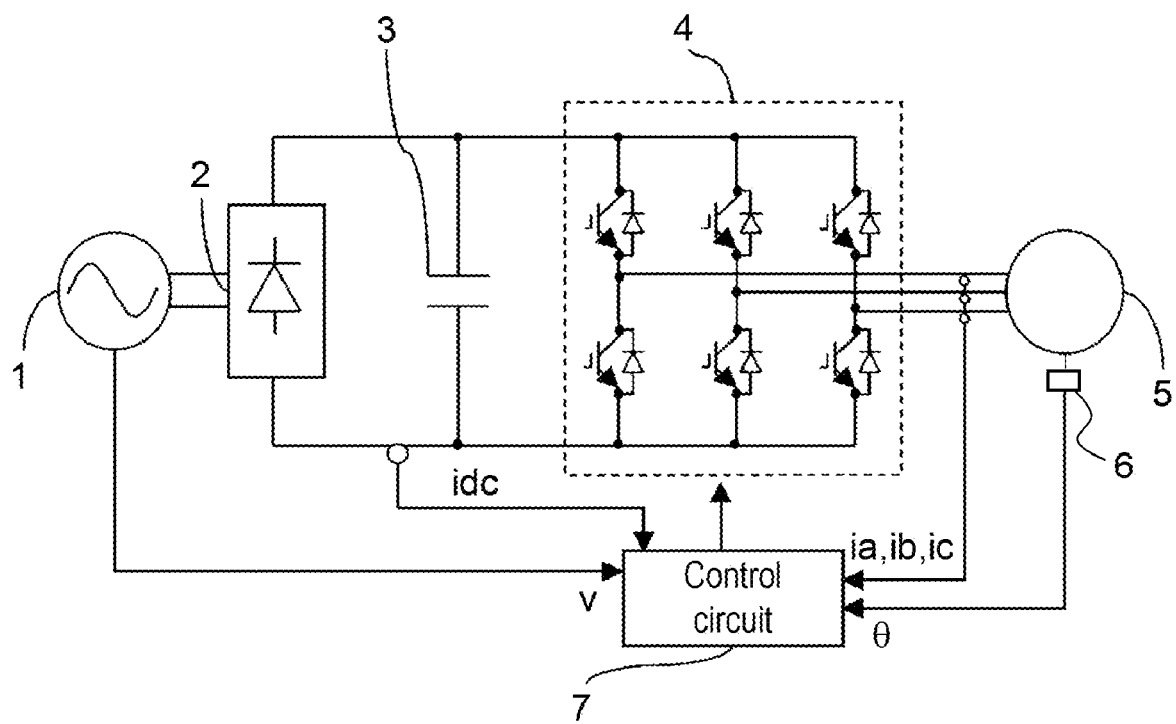
FIG. 6 shows a block diagram illustrating a conventional motor drive inverter control apparatus.

FIG. 5 shows a block diagram illustrating a motor drive inverter control apparatus in accordance with the second embodiment of the present invention. The same structural elements as those used in the first embodiment have the same reference marks and the detailed descriptions thereof are omitted here. In this second embodiment, resistor 23 used in the first embodiment is replaced with variable load 32 (hereinafter referred to as a variable resistor), and voltage sensor 31 is provided for sensing a voltage of second capacitor 22.

An operation of the foregoing motor drive inverter control apparatus in accordance with the second embodiment is demonstrated hereinafter. First, when regenerative energy is not available, namely, when voltage sensor 31 senses a voltage across second capacitor 22 be lower than the peak value of AC power supply 11, variable resistor 32 is set at a value where the min. energy is consumed (in other words, variable resistor 32 is set at a greater value), so that the energy is consumed as little as possible.

Then the regenerative energy is produced, and voltage sensor 31 senses the voltage across second capacitor 22 exceed the peak voltage of AC power supply 11. In this case, variable resistor 32 is set at a value where a large amount of energy is consumed (in other words, variable resistor 32 is set at a smaller value), thereby consuming the regenerative energy quickly.

Variable resistor 32 can be formed of plural resistors coupled in series or in parallel, and those resistors can be shorted or opened by a switching element such as a transistor for changing a resistance value in response to a voltage sensed by voltage sensor 31. Variable resistor 32 also can employ a variable resisting element such as a varistor, which decreases its resistance as the voltage increases.

As discussed above, the motor drive inverter control apparatus in accordance with this second embodiment comprises the following elements:
rectifier circuit 12 for rectifying the AC power supplied from AC power supply 11 into DC power;
inverter 14 for converting the DC power obtained by rectifier circuit 12 into AC power;
motor 15 for receiving the AC power obtained by inverter 14;
first capacitor 13 hooked up between DC bus lines of inverter 14 and having extremely small capacitance;
second capacitor 22 coupled in parallel to first capacitor 13 via diode 21;
variable resistor 32 coupled in parallel to second capacitor 22; and
voltage sensor 31 for determining a value of variable resistor 32.

The foregoing structure allows consuming energy in response to a voltage across second capacitor 22, so that second capacitor can have small capacitance. As a result, the motor drive inverter control apparatus can be further downsized, and the advantage of preventing respective driving elements from degrading caused by an over-voltage can be maintained.

Control circuit 17, which is essential to drive inverter 14, can incorporate variable resistor 32 and voltage sensor 31 in itself, thereby reducing the number of components. As a result, the motor drive inverter control apparatus can be further downsized, and the advantage of preventing respective driving elements from degrading caused by an over-voltage can be maintained.

On top of that, second capacitor 22 offers its energy as a power supply of the control circuit, so that the inverter control apparatus can be still further downsized and becomes more efficient. Use of motor 15 for driving a compressor of a refrigerating or an air-conditioning system such as a condenser, a decompressor, and an evaporator allows obtaining a compact refrigerating or an air-conditioning system which can prevent its driving elements from degrading caused by an over-voltage due to the regenerative energy. Use of motor 15 for driving a blower allows obtaining a compact blowing system which can prevent its driving elements from degrading caused by an over-voltage due to the regenerative energy.

INDUSTRIAL APPLICABILITY

The motor drive inverter control apparatus of the present invention has the following mechanism: an AC power supply is rectified by a rectifier circuit and smoothed by a small capacitive first capacitor, and a second capacitor absorbs regenerative energy produced at a slowdown or a halt of the motor. This mechanism prevents respective driving elements from degrading caused by an over-voltage. On top of that, the second capacitor has few ripples, so that there is no need to worry about degradation due to the heat by ripples, and an inexpensive electrolytic capacitor can be used. As a result, a compact and inexpensive motor drive inverter control apparatus is obtainable, and the apparatus can be employed for driving a compressor or a blower of a refrigerating or an air-conditioning system.

The invention claimed is:

1. A motor drive inverter control apparatus comprising:
    a rectifier circuit for rectifying an AC power supply;
    an inverter circuit driven by an output from the rectifier circuit;
    a motor driven by an output from the inverter circuit;
    a first capacitor coupled in parallel to the output of the rectifier circuit;
    a second capacitor coupled in parallel to the first capacitor via a diode;
    a control power supply circuit coupled in parallel to the second capacitor; and
    a control circuit, driven by the control power supply circuit, for controlling the inverter circuit,
    wherein the first capacitor has a capacity that provides an input voltage to the inverter circuit having a ripple content greater than or equal to 90% over a range of use of the motor, and
    regenerative energy produced by the motor is absorbed by the first and the second capacitors.

2. The motor drive inverter control apparatus of claim 1 further comprising a discharging load coupled in parallel to the second capacitor.

3. The motor drive inverter control apparatus of claim 2, wherein the discharging load is a resistor.

4. The motor drive inverter control apparatus of claim 1, wherein the second capacitor has a capacity greater than or equal to three times a capacity of the first capacitor.

5. The motor drive inverter control apparatus of claim 1, wherein the second capacitor is an electrolytic capacitor.

6. The motor drive inverter control apparatus of claim 1, wherein the control power supply circuit works as a discharging load for the second capacitor.

7. The motor drive inverter control apparatus of claim 1, wherein the inverter circuit is formed of six switching elements coupled together into a three-phase bridge.

8. The motor drive inverter control apparatus of claim 1, further comprising a variable load and a voltage sensor coupled in parallel to the second capacitor, wherein an output from the voltage sensor determines a value of the variable load.

9. The motor drive inverter control apparatus of claim 8, wherein the variable load is a variable resistor which selects a smaller resistance value at a greater voltage sensed by the voltage sensor.

10. The motor drive inverter control apparatus of claim 8, wherein the control circuit includes the variable load and the voltage sensor.

11. The motor drive inverter control apparatus of claim 1, wherein the motor drives a compressor of a refrigerating system or an air-conditioning system including at least one of a condenser, a decompressor or an evaporator.

12. The motor drive inverter control apparatus of claim 1, wherein the motor drives a blower.

13. The motor drive inverter control apparatus of claim 1, wherein the motor is a brush-less DC motor.

* * * * *